(12) United States Patent
Lee

(10) Patent No.: US 10,298,155 B2
(45) Date of Patent: May 21, 2019

(54) APPARATUS FOR CONTROLLING INVERTER

(71) Applicant: LSIS CO., LTD., Anyang-si, Gyeonggi-do (KR)

(72) Inventor: Sun-Woo Lee, Anyang-si (KR)

(73) Assignee: LSIS CO., LTD., Anyang-si, Gyeonggi-do (KR)

( * ) Notice: Subject to any disclaimer, the term of this patent is extended or adjusted under 35 U.S.C. 154(b) by 0 days.

(21) Appl. No.: 15/847,232

(22) Filed: Dec. 19, 2017

(65) Prior Publication Data

US 2018/0219496 A1 Aug. 2, 2018

(30) Foreign Application Priority Data

Feb. 1, 2017 (KR) .................. 10-2017-0014323

(51) Int. Cl.
| | | |
|---|---|---|
| *H02M 1/32* | (2007.01) | |
| *H02P 3/18* | (2006.01) | |
| *H02P 3/22* | (2006.01) | |
| *H02P 29/68* | (2016.01) | |
| *H02M 7/5387* | (2007.01) | |

(52) U.S. Cl.
CPC .............. *H02P 3/22* (2013.01); *H02M 1/32* (2013.01); *H02P 29/68* (2016.02); *H02M 7/5387* (2013.01); *H02M 2001/327* (2013.01)

(58) Field of Classification Search
CPC .............. H02M 1/32; H02P 3/14; H02P 6/24

USPC ..... 318/380, 362, 376, 400.17, 400.26, 801, 318/803
See application file for complete search history.

(56) References Cited

FOREIGN PATENT DOCUMENTS

| | | | | |
|---|---|---|---|---|
| EP | 2506423 A2 * | 10/2012 | ................ | H02P 3/22 |
| JP | S59-195994 U | 12/1984 | | |
| JP | 2003333873 A | 11/2003 | | |
| JP | 3623328 B2 | 2/2005 | | |
| JP | 2005253213 A | 9/2005 | | |
| JP | 4062967 B2 | 3/2008 | | |
| JP | 5876681 B2 | 3/2016 | | |
| JP | 6017100 B1 | 10/2016 | | |
| JP | 2018007334 A | 1/2018 | | |
| KR | 100547336 B1 | 1/2006 | | |

OTHER PUBLICATIONS

European Search Report for related European Application No. 17206136.8; report dated Jun. 13, 2018; (10 pages).
Japanese Office Action for related Japanese Application No. 2017-242004; action dated Jan. 11, 2019; (4 pages).

* cited by examiner

*Primary Examiner* — Bickey Dhakal
*Assistant Examiner* — Charles S Laughlin
(74) *Attorney, Agent, or Firm* — K&L Gates LLP

(57) ABSTRACT

Disclosed herein is an apparatus for controlling an inverter. The apparatus controls a braking resistor connected in parallel with a DC link capacitor to switch to an ON or OFF state based on at least one of the temperature and the DC link voltage of the braking resistor.

5 Claims, 4 Drawing Sheets

APPARATUS FOR CONTROLLING INVERTER

CROSS-REFERENCE TO RELATED APPLICATIONS

This application claims the priority of Korean Patent Application No. 10-2017-0014323 filed on Feb. 1, 2017, in the Korean Intellectual Property Office, the disclosure of which is hereby incorporated by reference in its entirety.

BACKGROUND

1. Technical Field

The present disclosure relates to an apparatus for controlling an inverter.

2. Description of the Related Art

Generally, inverters are power conversion devices configured to convert a mains electricity alternating-current (AC) power into a direct-current (DC) power, convert the DC power to an AC power suitable for a motor, and then supply the AC power to the motor. These inverters effectively control the motor, thereby reducing power consumption of the motor and improving energy efficiency.

In such an inverter, a diode rectifier is configured to allow power to be transferred in one direction. Accordingly, when the motor decelerates or applies regenerative braking, the power flowing reversely is not output to the system power source, but is accumulated in a DC link capacitor, and thus the DC link voltage increases. In order to prevent this effect, a braking resistor may be added to both ends of the DC link capacitor, thereby suppressing an increase in the DC link voltage and preventing damage to the inverter.

Such a braking resistor produces heat while consuming energy to increase the DC link voltage. Accordingly, the usage rate of the braking resistor is limited to prevent the braking resistor from overheating.

FIGS. 1 and 2 illustrate methods of limiting the usage rate of a conventional braking resistor, which limits the proportion of the time T_dec of a speed reduction rate section, in which the regenerative energy is generated, in the entire operation time.

In the example of FIG. 1, the usage rate of the braking resistor is given by the following equation.

$$\% \ ED = \frac{T\_dec}{T\_acc + T\_steady + T\_dec + T\_stop} \times 100 \quad \text{[Equation 1]}$$

Here, T_acc denotes the time taken to accelerate up to a set frequency, T_steady denotes the time for constant speed operation at the set frequency, and T_stop denotes the time for which the operation remains stopped until the operation is started again.

According to the conventional method, the user sets a limit level of % ED, or the usage rate, and limits use of the braking resistor so as not to exceed the set level by calculating the actual % ED.

In the example of FIG. 2, the usage rate of the braking resistor is given by the following equation.

$$\% \ ED = \frac{T\_dec}{T\_dec + T\_steady1 + T\_acc + T\_steady2} \times 100 \quad \text{[Equation 2]}$$

Thus, in conventional cases, overheating of the braking resistor is prevented by limiting the usage rate of the braking resistor.

However, in the conventional technology, when the motor decelerates slowly, the braking resistor can be used for a relatively long time since the regenerative energy is small. However, since only time is taken into consideration in limiting the usage rate of the braking resistor, the braking resistor may not be used properly. When the motor decelerates rapidly, the braking resistor should be used for a relatively short period of time since the regenerative energy is large. However, the braking resistor may not be used properly since only time is taken into consideration in limiting the usage rate of the braking resistor as in the previous case.

In addition, if only time is taken into consideration in limiting the usage rate of the braking resistor, the braking resistor may accumulate heat to overheat when the acceleration/speed reduction rate of the motor frequently occurs.

Further, according to the conventional technology, the usage time and usage rate should be calculated after the braking resistor is selected, which causes inconvenience to the user.

SUMMARY

It is an object of the present disclosure to provide an inverter control apparatus capable of efficiently protecting a braking resistor from overheating while efficiently using the same.

It is another object of the present disclosure to provide an inverter control apparatus capable of automatically calculating a usage rate of a braking resistor and enhancing convenience for a user.

Objects of the present disclosure are not limited to the above-described objects and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an apparatus for controlling an inverter in an inverter system including a converter unit for converting a mains electricity power into a direct current (DC) voltage, a DC link capacitor for storing the DC voltage, and an inverter unit for converting the DC voltage into an alternating current (AC) voltage having a predetermined frequency may include a braking resistor connected in parallel with the DC link capacitor, a switching unit for switching the braking resistor to an ON state or an OFF state, and a controller for transmitting a control signal to the switching unit to switch the braking resistor to the ON state or the OFF state based on at least one of a temperature and DC link voltage of the braking resistor.

In an embodiment of the present invention, when the DC link voltage exceeds a reference voltage, the controller may transmit a control signal to the switching unit to switch the braking resistor to the OFF state when the temperature of the braking resistor is higher than or equal to a reference temperature.

In an embodiment of the present invention, when the DC link voltage exceeds a reference voltage, the controller may transmit a control signal to the switching unit to switch the braking resistor to the ON state when the temperature of the braking resistor is lower than a reference temperature.

In an embodiment of the present invention, when the DC link voltage reaches a reference voltage by a motor decelerating at a first speed reduction rate, the controller may transmit a control signal to the switching unit to switch the braking resistor to the ON state.

In an embodiment of the present invention, when the temperature of the braking resistor reaches an OFF reference temperature, the controller may transmit a control signal to the switching unit to switch the braking resistor to the OFF state.

In an embodiment of the present invention, the controller may control the inverter unit such that the motor operates at a second speed reduction rate lower than the first speed reduction rate.

In an embodiment of the present invention, when the DC link voltage reaches an ON reference voltage, the controller may control the inverter unit to adjust the motor to a third speed reduction rate lower than the first speed reduction rate and a second speed reduction rate to maintain the DC link voltage at the reference voltage.

In an embodiment of the present invention, when the temperature of the braking resistor reaches an ON reference temperature, the controller may transmit a control signal to the switching unit to switch the braking resistor to the ON state.

In an embodiment of the present invention, the controller may control the inverter unit to decelerate the motor at the first speed reduction rate.

In an embodiment of the present invention, when the DC link voltage reaches an OFF reference voltage, the controller may transmit a control signal to the switching unit to switch the braking resistor to the OFF state.

According to the present disclosure as described above, a braking resistor can be efficiently used by turning the braking resistor on or off according to the temperature of the braking resistor. Further, as operation is performed in conjunction with the temperature and DC link voltage of the braking resistor, the braking resistor can be used easily even if the usage rate of the braking resistor is not preset.

Further, as operation is performed in conjunction with the temperature and the DC link voltage of the braking resistor, the braking resistor can be prevented from overheating due to erroneously setting of the usage rate of the braking resistor.

DETAILED DESCRIPTION

In order to fully understand the structure and effects of the present disclosure, preferred embodiments of the present disclosure will be described with reference to the accompanying drawings. However, the present disclosure is not limited to the embodiments described below, but may be embodied in various forms and various changes may be made therein. The exemplary embodiments are intended to provide a complete disclosure of the present invention and to provide a person skilled in the art with a complete disclosure of the scope of the present invention. In the accompanying drawings, the constituent elements are enlarged in size for convenience of explanation, and the proportions of the constituent elements may be exaggerated or minimized.

It will be also understood that when an element is described as being "on" or "contacting" another element, it can be directly connected to or contacting the other element or "intervening" elements may be present. On the other hand, if an element is described as being "directly on" or "directly contacting" another element, this can be understood as meaning that there is no other element between the elements. Other expressions that describe the relationship between elements, for example, "between" and "directly between" can be similarly interpreted.

Terms including ordinal numbers such as first, second, etc. may be used to explain various components, but the components are not limited thereto. These terms are used only for the purpose of distinguishing one component from another. For example, a "first component" may be referred to as a "second component", and similarly, a "second component" may also be referred to as a "first component" without departing from the scope of the present disclosure.

The singular forms "a", "an", and "the" include plural referents unless the context clearly dictates otherwise. In this specification, a term "include" or "have" is intended to indicate that characteristics, figures, steps, operations, constituents, and components disclosed in the specification or combinations thereof exist and can be interpreted as meaning that one or more other characteristics, figures, steps, operations, constituents, components, or combinations thereof can be added.

The terms used in the embodiments of the present disclosure may be construed as having meanings commonly known to those skilled in the art unless otherwise defined.

Hereinafter, preferred embodiments of the present disclosure will be described in detail with reference to the accompanying drawings.

Figure 1:
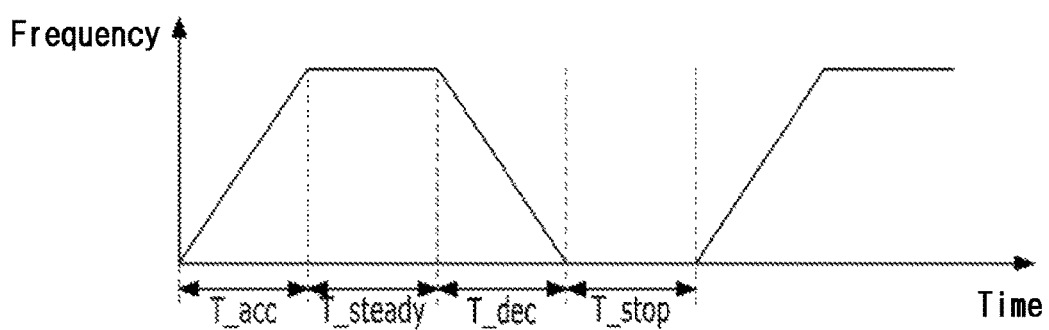
FIGS. 1 and 2 illustrate methods of limiting the usage rate of a conventional braking resistor.
Figure 2:
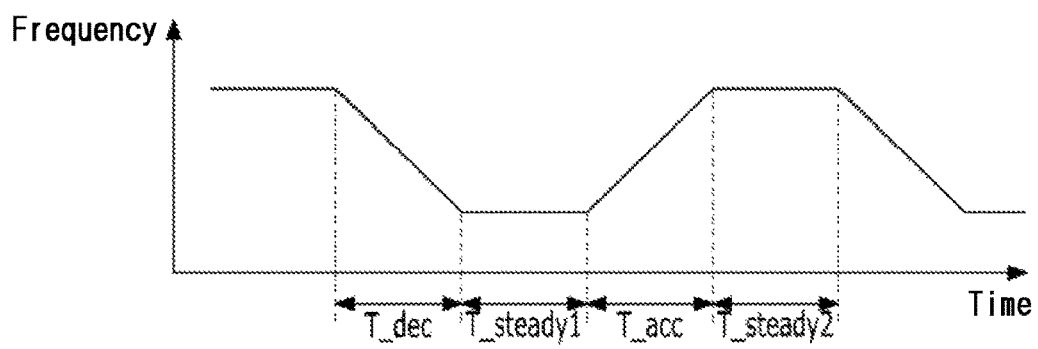
Figure 3:
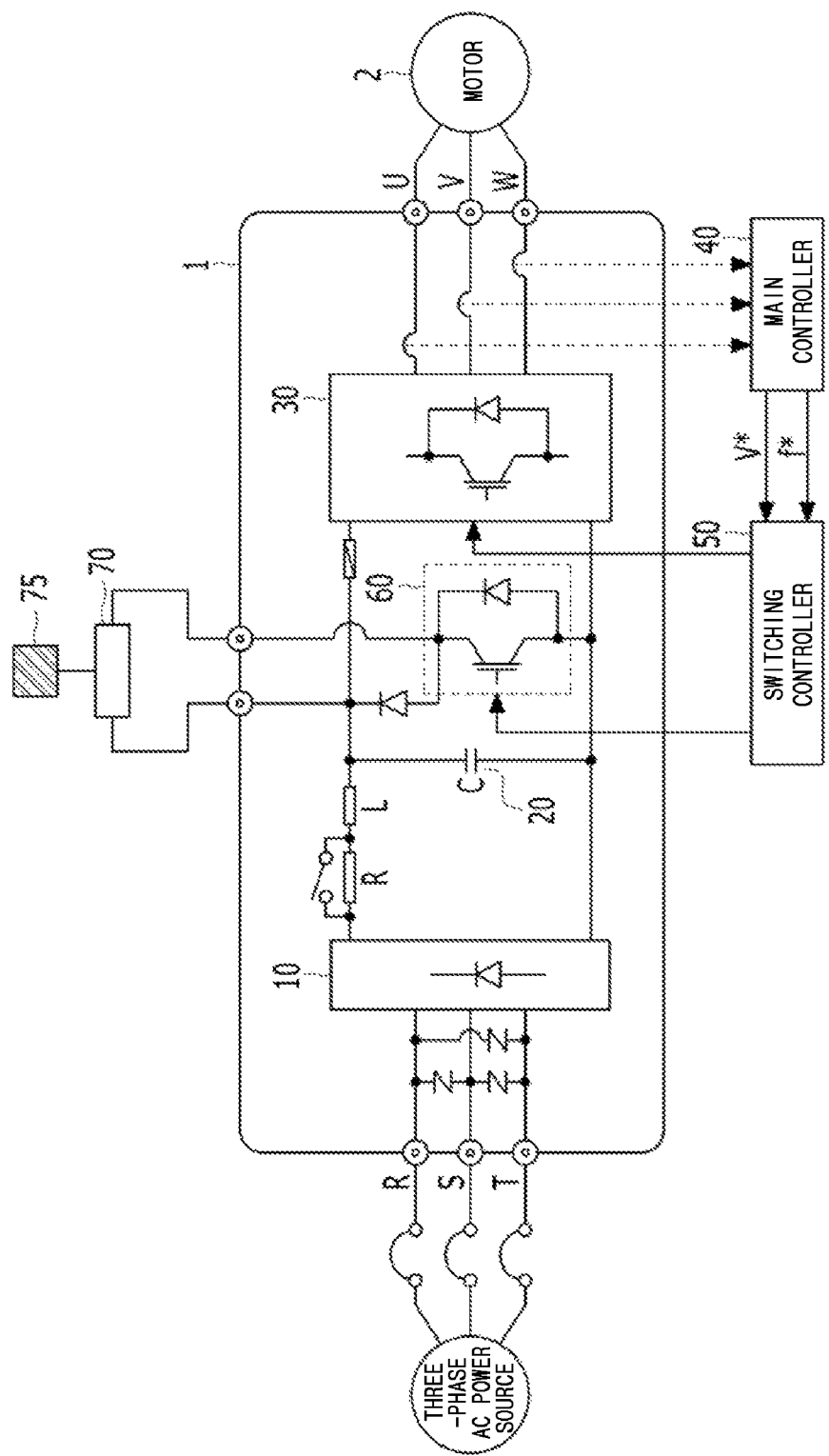
FIG. 3 is a diagram schematically illustrating an inverter system to which an embodiment of the present disclosure is applied.

FIG. 3 is a diagram schematically illustrating an inverter system to which an embodiment of the present disclosure is applied.

As shown in FIG. 3, in an inverter system to which an embodiment of the present disclosure is applied, an inverter 1, which receives three-phase alternating-current (AC) power and outputs power of a predetermined magnitude and frequency to a motor 2, may include a converter unit 10, a smoothing unit 20, an inverter unit 30, a main controller 40, a switching controller 50, a switching unit 60, a braking resistor 70, and a temperature sensor 75 for measuring the temperature of the braking resistor 70.

The converter unit 10 may convert the input three-phase AC power into a direct-current (DC) voltage. The converter unit 10 may include a plurality of rectifier diodes, or may include a plurality of switching elements. The smoothing unit 20 may include a DC link capacitor and may smooth and store the DC voltage obtained through conversion in the converter unit 10. The inverter unit 30 may include a plurality of switching elements. The DC voltage stored in the DC link capacitor may be converted into a voltage of a predetermined magnitude and frequency and output to the motor 2 under control of the switching controller 50.

The braking resistor 70 may be connected in parallel to the DC link capacitor and configured to consume the voltage stored in the DC link capacitor by turning on or off the switching unit 60. That is, when the switching unit 60 is in the ON state, the power applied to the DC link is consumed by the braking resistor 70. When the switching unit 60 is in the OFF state, the voltage applied to the DC link is provided to the inverter unit 30.

The main controller 40 may generate a command frequency and command voltage based on the output current of the inverter unit 30 and provide the same to the switching controller 50. Based on the command frequency and the command voltage, the switching controller 50 may transmit, to the inverter unit 30, a control signal for controlling the plurality of switching elements of the inverter unit 30.

In addition, the main controller 40 may generate a control signal for controlling the switching unit 60 to switch the braking resistor 70 to the ON or OFF state based on the output current, and ON/OFF of the switching unit 60 may be controlled by the control signal.

Specifically, when the DC link voltage exceeds a reference voltage, the main controller 40 may receive the temperature of the braking resistor 70. If the received temperature is higher than or equal to a reference temperature, the main controller 40 may transmit, to the switching controller 50, a control signal for causing the braking resistor 70 to be turned off so as not to operate, and the switching controller 50 may control the switching unit 60 to be turned off by the control signal.

If the received temperature is lower than the reference temperature, the main controller 40 may transmit, to the switching controller 50, a control signal for causing the braking resistor 70 to be turned on to operate, and the switching controller 50 may control the switching unit 60 to be turned on by the control signal. For this operation, the main controller 40 may apply hysteresis to prevent frequent occurrence of ON or OFF at the reference voltage and the reference temperature.

While it is illustrated in an embodiment of the present disclosure that the main controller 40 receives the temperature of the braking resistor 70 from the temperature sensor 75, the present disclosure is not limited thereto. That is, various methods for estimating the temperature of the braking resistor 70 may be used. For example, the temperature of the braking resistor 70 may be estimated by measuring or estimating a current flowing through the braking resistor 70 or a voltage applied to the braking resistor 70, by using the thermal resistance of the braking resistor 70, or by using the ambient temperature. As such, various methods may be used to estimate the temperature of the braking resistor 70.

Hereinafter, operation of the main controller 40 will be described with reference to the drawings.

Figure 4:
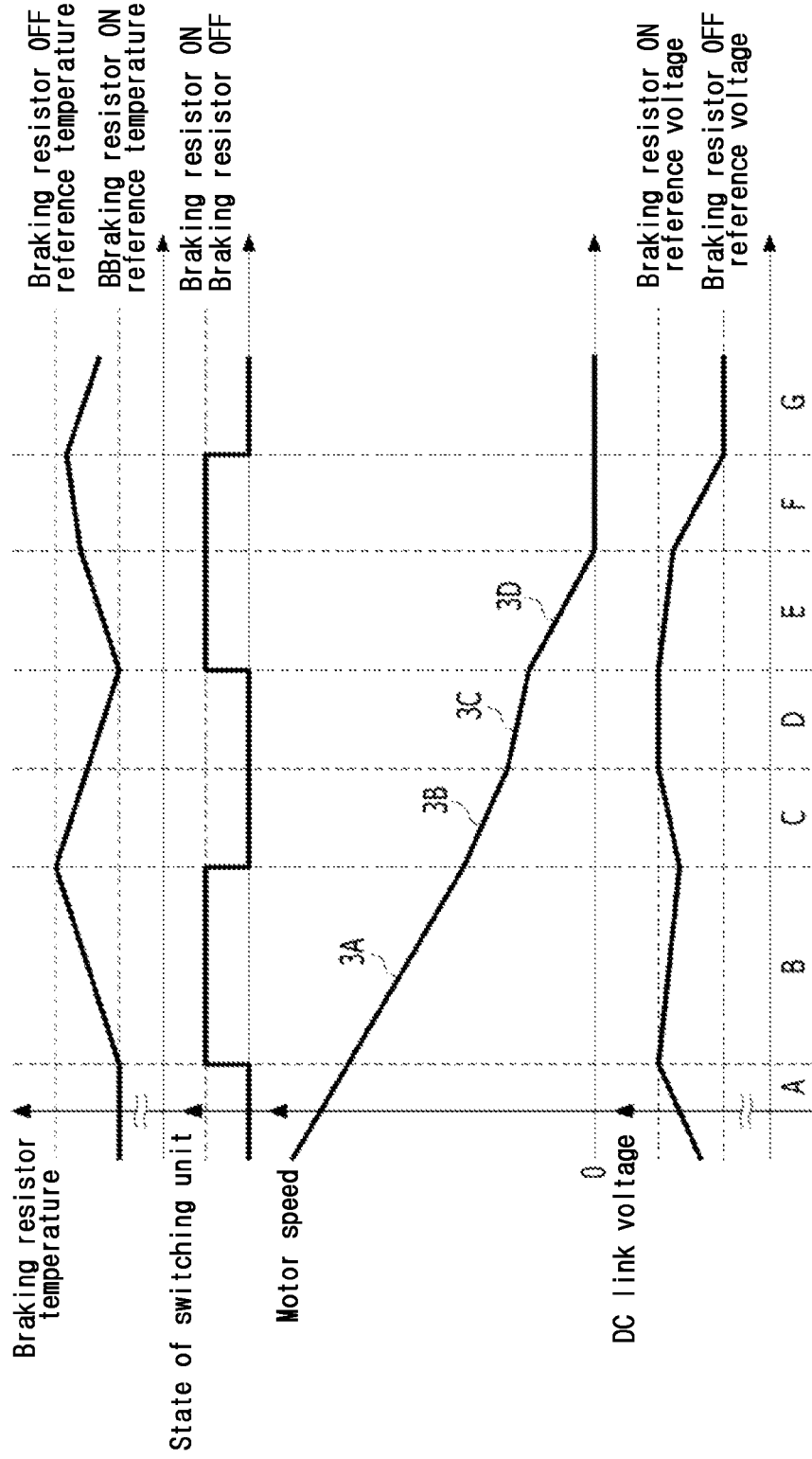
FIG. 4 is an exemplary diagram illustrating on/off control of a braking resistor according to an embodiment of the present disclosure.

FIG. 4 is an exemplary diagram illustrating on/off control of a braking resistor according to an embodiment of the present disclosure.

As shown in FIG. 4, when the motor 2 decelerates in section A, the DC link voltage rises. In section A, the DC link voltage does not reach the braking resistor ON reference voltage, and thus the switching unit 60 may be in the OFF state.

When the DC link voltage reaches the braking resistor ON reference voltage in the section B, the main controller 40 may transmit, to the switching controller 50, a control signal for controlling the switching unit 60 to be turned on, and the switching controller 50 may be switched to the ON state according to the control signal. As a result, the DC link voltage may decrease and the temperature of the braking resistor 70 may rise.

When the temperature of the braking resistor 70 reaches a braking resistor OFF reference temperature in section C, the main controller 40 may transmit, to the switching controller 50, a control signal for controlling the switching unit 60 to be turned off, and the switching unit 60 may switch to the OFF state according to the control signal. In this section, the voltage, which has decreased in section B, may increase again. Thus, the main controller 40 may provide a command frequency of the inverter unit 30 to the switching controller 50 such that the speed reduction rate of the motor 2 is reduced. In other words, the speed reduction rate 3B in section C may be lower than the speed reduction rate 3A in section B. The speed reduction rate ratio 3B may be preset or may be determined based on the output current or the DC link voltage fed back from the inverter unit 30.

In section D, the main controller 40 does not reach a braking resistor ON reference temperature although the braking resistor 70 is off. When the DC link voltage reaches the braking resistor ON reference voltage, the speed reduction rate of the motor 2 may be lowered over the speed reduction rate in section C, generate a command frequency for maintaining the DC link voltage at the reference voltage of the braking resistor and provide the same to the switching controller 50. That is, the speed reduction rate 3C in section D may be lower than the speed reduction rate 3B in section C. Here, the speed reduction rate 3C may be preset or may be determined based on the output current or the DC link voltage fed back from the inverter unit 30.

In sections C and D, since the switching unit 60 of the braking resistor 70 is in the OFF state, the temperature of the braking resistor 70 gradually decreases.

In section E, since the temperature of the braking resistor 70 is as low as the braking resistor ON reference temperature, the main controller 40 may transmit, to the switching controller 50, a control signal for controlling the switching unit 60 to be turned on, and the switching unit 60 may switch to the ON state according to the control signal. In this section, the speed reduction rate 3D of the speed of the motor may be equal to the speed reduction rate 3A in section B. In other words, since the braking resistor 70 is in the ON state in section E, the main controller 40 may change the command frequency to increase the speed reduction rate of the motor 2 and provide the changed command frequency to the switching controller 50.

In section F, the motor 2 is stopped, but the main controller 40 may maintain the braking resistor 70 in the ON state because the DC link voltage is greater than the braking resistor OFF reference voltage.

In section G, since the motor 2 is stopped, and the DC link voltage is reduced to the braking resistor OFF reference voltage, the main controller 40 may transmit, to the switching controller 50, a control signal for controlling the switching unit 60 to be turned off, and the switching unit 60 may switch to the OFF state according to the control signal.

As such, in an embodiment of the present disclosure, the temperature of the braking resistor 70 is measured or estimated, and the braking resistor 70 is turned on or off according to the temperature of the braking resistor 70. Thereby, the braking resistor 70 may be efficiently used. In addition, as operation is performed in conjunction with the temperature and DC link voltage of the braking resistor 70, the braking resistor 70 can be used easily even if the usage rate of the braking resistor is not preset. Further, as operation is performed in conjunction with the temperature and the DC link voltage of the braking resistor 70, the braking resistor 70 can be prevented from overheating due to erroneously setting of the usage rate of the braking resistor.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims. Accordingly, the true scope of the present disclosure should be determined by the following claims.

What is claimed is:

1. An apparatus for controlling an inverter in an inverter system including a converter unit for converting a mains electricity power into a direct current (DC) voltage, a DC link capacitor for storing the DC voltage, and an inverter unit for converting the DC voltage into an alternating current (AC) voltage having a predetermined frequency, the apparatus comprising:
   a braking resistor connected in parallel with the DC link capacitor;
   a switching unit having an ON state or an OFF state, wherein when the switching unit is in the ON state, the DC voltage stored in the DC link capacitor is consumed by the braking resistor; and
   a controller for transmitting a control signal to switch the switching unit to the ON state or the OFF state based on at least one of a temperature and DC link voltage of the braking resistor,
   wherein, when the DC link voltage reaches an ON reference voltage by a motor decelerating at a first speed reduction rate, the controller is configured to transmit a control signal to the switching unit to switch the switching unit to the ON state,
   wherein, when the temperature of the braking resistor reaches an OFF reference temperature, the controller is configured to transmit a control signal to the switching unit to switch the switching unit to the OFF state, and
   wherein, when the DC link voltage reaches the ON reference voltage, the controller is configured to control the inverter unit to adjust the motor to a third speed reduction rate lower than the first speed reduction rate and a second speed reduction rate to maintain the DC link voltage at the ON reference voltage.

2. The inverter control apparatus according to claim 1, wherein the controller is configured to control the inverter unit such that the motor operates at the second speed reduction rate lower than the first speed reduction rate.

3. The apparatus according to claim 1, wherein, when the temperature of the braking resistor reaches an ON reference temperature, the controller is configured to transmit a control signal to the switching unit to switch the switching unit to the ON state.

4. The apparatus according to claim 3, wherein the controller is configured to control the inverter unit to decelerate the motor at the first speed reduction rate.

5. The apparatus according to claim 4, wherein, when the DC link voltage reaches an OFF reference voltage, the controller is configured to transmit a control signal to the switching unit to switch the switching unit to the OFF state.

* * * * *